United States Patent [19]

Suzuki et al.

[11] Patent Number: 4,635,143
[45] Date of Patent: Jan. 6, 1987

[54] WAVEFORM EQUALIZER FOR SIGNAL REPRODUCED FROM MAGNETIC RECORDING MEDIUM

[75] Inventors: Hiroshi Suzuki, Saitama; Makoto Imamura, Kanagawa, both of Japan

[73] Assignee: Kabushiki Kaisha Toshiba, Kawasaki, Japan

[21] Appl. No.: 625,616

[22] Filed: Jun. 28, 1984

[30] Foreign Application Priority Data

Jun. 30, 1983 [JP] Japan .............................. 58-119336
Sep. 29, 1983 [JP] Japan .............................. 58-181271

[51] Int. Cl.$^4$ ........................... G11B 5/45; G11B 5/09
[52] U.S. Cl. ......................................... 360/65; 360/46
[58] Field of Search .................... 360/65, 46; 333/138, 333/28 R

[56] References Cited

U.S. PATENT DOCUMENTS 3,408,640 10/1968 Masson .................................. 360/65
4,535,417 8/1985 Peacock .............................. 364/724

OTHER PUBLICATIONS

"Improvement of Recording Density by Means of Cosine Equalizer", T. Kameyama, S. Takanami and R. Arai, Nov. 1976, pp. 746-748.
"Phase Distortions of Signals in Magnetic Recording Equipment": Telecommunications Radio Engineering, V29-30, pp. 114-120; V. B. Minukhin; Oct. 1973.
"Phase Equalization for Perpendicular Recording": IEEE Trans. on Magnetics vol. Mag-18, No. 6, Nov. 1982; pp. 1247-1249; B. J. Langland.

Primary Examiner—Vincent P. Canney
Attorney, Agent, or Firm—Oblon, Fisher, Spivak, McClelland, & Maier

[57] ABSTRACT

A waveform equalizer is arranged to transform a signal reproduced from a magnetic recording medium and having a longitudinal waveform component to a signal of a perpendicular waveform. The waveform equalizer comprises a tapped delay line having a first end connected to receive the reproduced signal and a second end arranged to reflect the reproduced signal, and a weighting adder for weighting tap voltages of the tapped delay line and adding together the weighted voltages. A combiner may be provided to additively or subtractively combine an output signal of the weighting adder with an output signal of either the tapped delay line or another delay line receiving the reproduced signal so as to transform a reproduced signal having both longitudinal and perpendicular waveform components to a signal with a longitudinal waveform or a perpendicular waveform. The second end of the tapped delay line may be short-circuited or connected to a resistor in order to reflect the signal.

15 Claims, 10 Drawing Figures

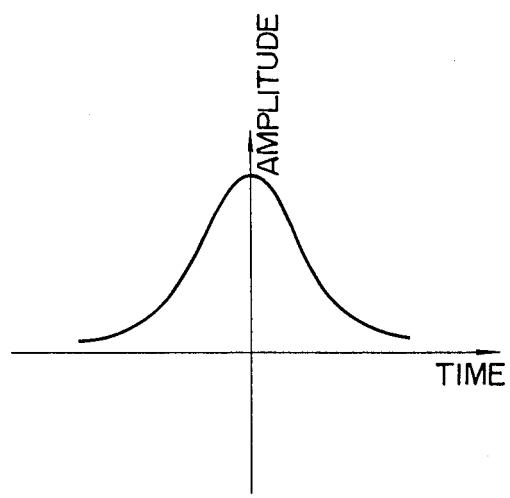
F I G. 1A
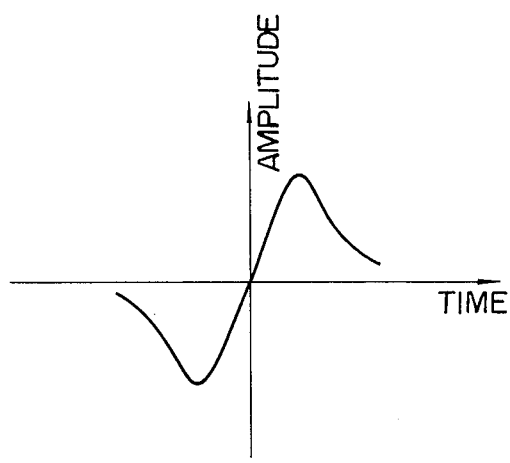
F I G. 1B
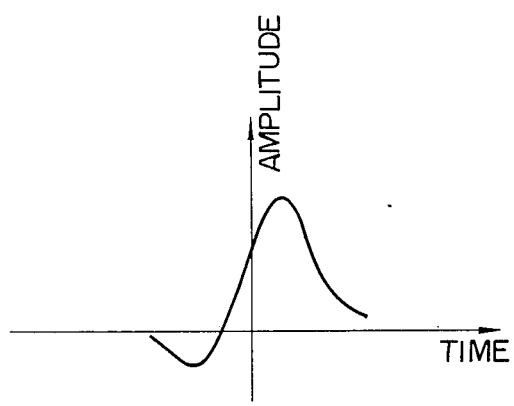
F I G. 1C

WAVEFORM EQUALIZER FOR SIGNAL REPRODUCED FROM MAGNETIC RECORDING MEDIUM

BACKGROUND OF THE INVENTION

The present invention relates to a waveform equalizer for equalizing the waveform of a signal reproduced from a magnetic recording medium.

With signal recording/reproduction system using a ring-shaped head and a longitudinal magnetic recording medium (i.e., magnetic field is oriented along the longitudinal direction of the medium), the isolated reproduced signal has a Lorentz waveform, as shown in FIG. 1A. The discrimination of this reproduced signal is usually performed by a peak detection technique using differentiation.

On the other hand, when a signal which is ideally recorded along the perpendicular direction is reproduced by a ring head from a perpendicular magnetic recording medium (i.e., magnetic field is oriented along the perpendicular direction or the direction of thickness), the reproduced signal becomes point-symmetrical at about the zero amplitude, as shown in FIG. 1B. Therefore, a zero-cross detection technique may be used for data discrimination.

However, in practice, with signal recording and reproduction system using a ring head and the perpendicular magnetic recording medium, a signal reproduced has an asymmetrical waveform obtained by superposing the waveform (referred to "longitudinal waveform" hereinafter) of FIG. 1A on the waveform (referred to "perpendicular waveform" hereinafter) of FIG. 1B, as shown in FIG. 1C. This asymmetrical composite waveform is subjected to data discrimination in accordance with: (1) the peak detection using differentiation like the longitudinal waveform and (2) the maximum inclined point detection by two-time differentiations. The method (1) has a disadvantage in that the peak shift is large due to waveform interference. The method (2) has a disadvantage in that the degradation of S/N ratio becomes large due to the differentiation.

The longitudinal waveform and the perpendicular waveform have a relation of the Hilbert transform, as described by V. B. Minukhin in "Phase Distortions of Signals in Magnetic Recording Equipment", Telecommunications Radio Engineering, Vols. 29–30, PP. 114–120 (referred to reference (1) hereinafter). Using this relationship, data discrimination of a composite waveform of the longitudinal and perpendicular waveforms may be performed without the disadvantages of methods (1) and (2).

A typical method is described by B. J. Langland in "Phase Equalization for Perpendicular Recording", IEEE Trans. on Magn., MAG-18, PP. 1247–1249 (referred to reference (2) hereinafter), according to which a Hilbert-transform filtered waveform of the composite waveform having the longitudinal and perpendicular waveform components and a constant-time delayed waveform of the composite waveform are combined at a predetermined ratio so as to convert the composite waveform to the purely longitudinal waveform for subsequent data discrimination. According to this method, the data discrimination margin can be increased, and the S/N ratio will not be degraded.

However, in reference (2), the detailed arrangement of the Hilbert-transform filter is not described. Reference (2) only describes that a tapped delay line is used. However, when a Hilbert-transform filter is constituted by a tapped delay line in the same manner as in the arrangement of a conventional transversal filter, the delay line is required to have a long delay time and many taps. Therefore, the delay line becomes large in size and costly. For use in magnetic recording/reproducing apparatus of small size and low cost, such a large and costly delay line will not be practical.

SUMMARY OF THE INVENTION

It is an object of the present invention to provide a waveform equalizer which is simple in construction to equalize a signal reproduced from a magnetic recording medium to a desired waveform.

The waveform equalizer of the invention basically comprises a tapped delay line having first and second terminals, and means for weighting tap voltages of the tapped delay line and adding together the weighted tap voltages. The first terminal of the tapped delay line is connected to receive a signal reproduced from a magnetic recording medium. The second terminal is short-circuited to reflect the signal supplied to the first terminal. Alternatively, the second terminal is connected to a reflecting terminal element such as a resistor. By properly selecting a delay time between adjacent taps of the tapped delay line and a weighting coefficient for a tap voltage, a desired Hilbert transform characteristics can be obtained. This basic arrangement enables a conversion from a longitudinal waveform to a perpendicular waveform.

An output voltage at the second terminal of the tapped delay line or a reproduced signal delayed by another delay line may be additively or subtractively combined with an output voltage of the weighting adder, so that a signal reproduced through a ring head from a magnetic recording medium having perpendicular components, and having both longitudinal and perpendicular waveform components may be equalized to a signal consisting of only a longitudinal or perpendicular waveform.

According to the present invention, since the reproduced signal is reflected at the second terminal of the tapped delay line, the delay time of a signal appearing at each tap becomes twice the delay time between the first and second terminals of the tapped delay line, and the number of taps becomes equivalently doubled. Therefore, as compared with a nonreflective tapped delay line, the delay line of the present invention can be made small and its cost can be correspondingly reduced. In addition to this advantage, the number of weighting elements such as resistors may be halved. For this reason, a small-sized and low-cost waveform equalizer can be provided.

BRIEF DESCRIPTION OF THE DRAWINGS

FIGS. 1A to 1C show a longitudinal waveform, a perpendicular waveform and a longitudinal-perpendicular composite waveform which are reproduced from magnetic recording media, respectively;

DETAILED DESCRIPTION OF THE PREFERRED EMBODIMENTS

Figure 2:
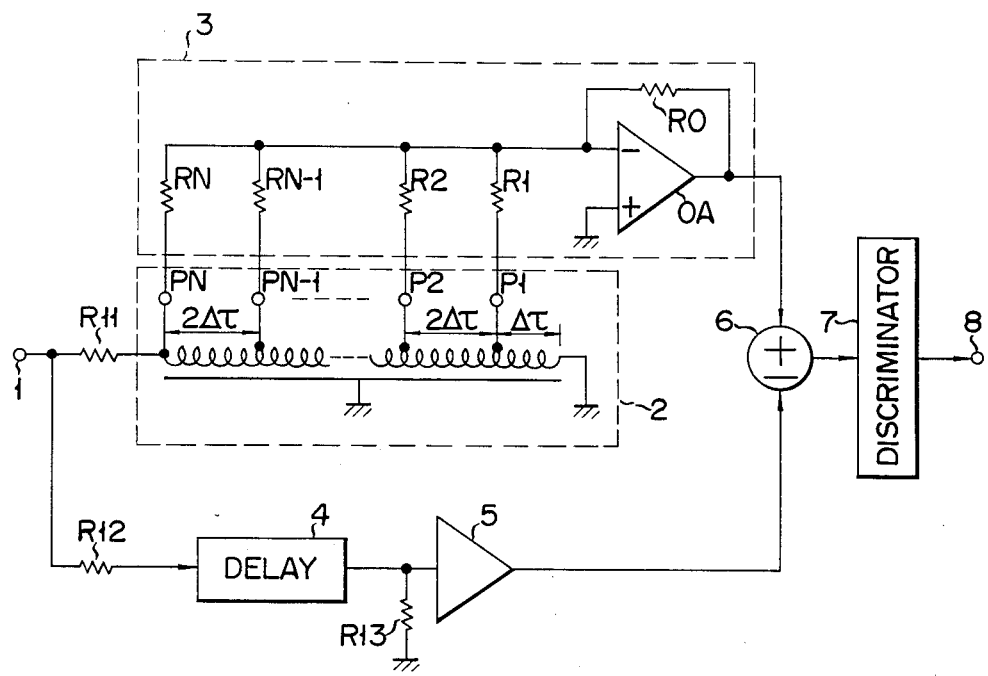
FIG. 2 shows an arrangement of a waveform equalizer according to an embodiment of the invention.

Referring to FIG. 2, an input terminal 1 of a waveform equalizer according to the invention receives a signal reproduced by a ring head from a magnetic recording medium having perpendicular magnetic field. In this specification, a magnetic recording medium having perpendicular field is defined to include a perpendicular anisotropic medium in which magnetic field is oriented mainly perpendicularly, and a recording medium which has longitudinal field as well as perpendicular field. When data is recorded by a ring head on the perpendicular magnetic recording medium and is reproduced therefrom, the reproduced signal has a longitudinal-perpendicular composite waveform, as shown in FIG. 1C.

The reproduced signal is supplied to one end of a tapped delay line 2 through a matching resistor R11. The tapped delay line 2 constitutes an LC delay line. The other end (receiving end) of tapped delay line 2 is terminated in a short circuit to provide reflecting termination. The tapped delay line 2 has N taps P1 to PN. Voltages at taps P1 to PN are added together by a weighting adder 3 which comprises weighting resistors R1 to RN, an operational amplifier OA and a feedback resistor RO.

The reproduced signal is also delayed by a predetermined delay time by a delay line 4 through a matching resistor R12. The delayed signal is then amplified by an amplifier 5. A matching resistor R13 is connected between input of amplifier 5 and ground. Output signals of weighting adder 3 and amplifier 5 are combined by a combiner (adder or subtracter) 6 to be subject to data discrimination in a discriminator 7. A discriminated output signal is taken from an output terminal 8. It should be noted that matching resistors R11, R12 and R13 are provided for preventing reflection at the respective inputs of tapped delay line 2, delay line 4 and amplifier 5.

A longitudinal waveform f(t) and a perpendicular waveform g(t) are related in accordance with the Hilbert transform as follows:

$$g(t) = \int_{-\infty}^{+\infty} f(\tau) \cdot \{1/(t-\tau)d\tau\} \quad (1)$$

Rewriting equation (1) into the frequency-domain representation, $$G(f) = e^{-j(\pi/2)sgn(t)} \cdot F(f) \quad (2)$$

where $$G(f) = \int_{-\infty}^{+\infty} g(t) \cdot e^{j2\pi ft} dt$$

$$F(f) = \int_{-\infty}^{+\infty} f(t) \cdot e^{j2\pi ft} dt$$

$$sgn(f) = \begin{cases} -1 f < 0 \\ +1 f \geq 0 \end{cases}$$

Figure 3A:
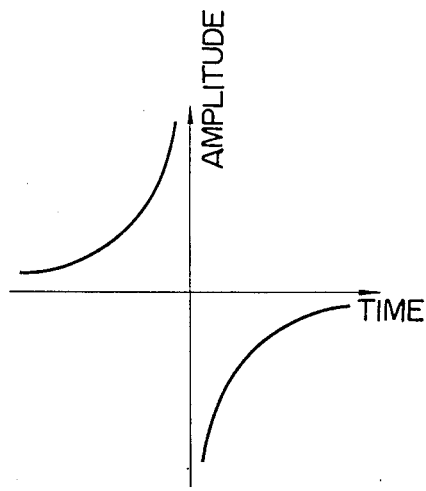
FIGS. 3A and 3B show impulse response characteristics and frequency characteristics of a Hilbert transform filter, respectively.
Figure 3B:
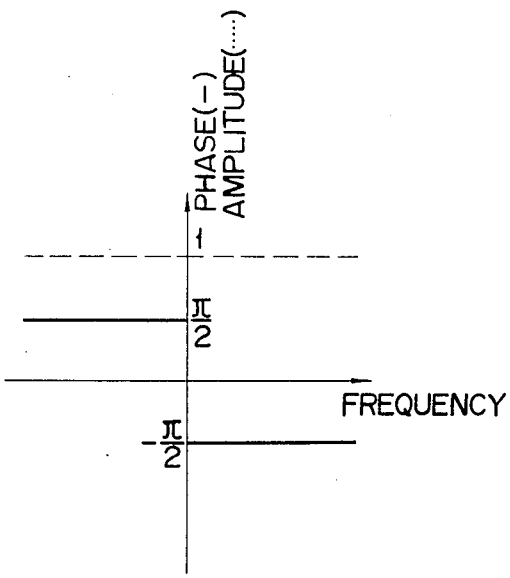

The impulse response characteristics and the frequency characteristics of the filter for achieving the Hilbert transformation are illustrated in FIGS. 3A and 3B, respectively. As is apparent from equation (2) and FIG. 3B, the amplitude characteristics of the Hilbert transform filter are flat, and the degradation of S/N ratio is not caused.

In FIG. 2, the tapped delay line 2 and weighting adder 3 constitute the Hilbert transform filter.

Let the longitudinal and perpendicular waveform components of a reproduced signal fR applied to input terminal 1 to be αH and αV respectively. Then, fR is represented on the complex plane as follows:

$$fR = \sqrt{\alpha H^2 + \alpha V^2} \cdot e^{j\theta} \quad (3)$$

where $\theta = \tan^{-1}(\alpha H/\alpha V)$

Figure 4:
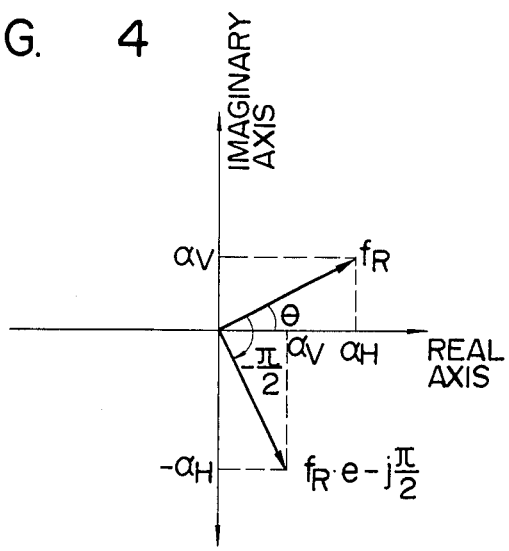
FIG. 4 shows the longitudinal and perpendicular composite waveform on a complex plane.

FIG. 4 shows the phasor diagram of fR. The reproduced signal fR is transformed by the Hilbert transform filter consisting of the tapped delay line 2 and the weighting adder 3 as follows:

$$H[fR] = \sqrt{\alpha H^2 + \alpha V^2} \cdot e^{j(\theta - \pi/2)} \quad (4)$$

On the other hand, the reproduced signal fR is delayed by delay line 4 by a delay time (equal to the delay time between the input and receiving end of tapped delay line 2). The delayed signal is amplified by a factor of αH/αV by amplifier 5. The amplified signal is added to the output of weighting adder 3 in adder 6. An output signal of adder 6, therefore, given by $$(\alpha H/\alpha V)fR + H[fR] \quad (5)$$

$$= \sqrt{\alpha H^2 + \alpha V^2} \cdot \{(\alpha H/\alpha V) \cdot e^{j\theta} + e^{j(\theta - \pi/2)}\}$$

$$= \alpha V\{1 + (\alpha H/\alpha V)^2\} \quad (6)$$

The resultant signal has only longitudinal waveform component. This signal may be discriminated by discriminator 7 in accordance with peak detection processing using differentiation.

If the amplification factor of amplifier 5 is set at αV/αH and a substractor is used as combiner 6, then the output signal of subtracter 6 will have only a perpendicular waveform component. In this case, the data discrimination may be performed by zero crossing detection in discriminator 7. The amplifier 5 is preferably a gain-controlled amplifier in order to accurately set its amplification factor at αH/αV or αV/αH.

The operation of tapped delay line 2 and weighting adder 3 will be described.

A signal applied to input terminal 1 appears at the respective taps Pi (i=1 to N) at a time delayed by 2(N−i)Δτ. The input signal is phase-inverted and reflected at the receiving end of tapped delay line 2 since the receiving end is grounded. The reflected signal appears at the respective taps Pi at a time delayed by (2i−1)Δτ like the input waveform. In this case, the delay time between adjacent taps is 2Δτ, except the delay time $\Delta\tau$ between the final tap P1 and the receiving end.

The incident wave and the reflected wave at the respective taps Pi are weighted with the corresponding resistors Ri ($i=1$ to N) and then added together by operational amplifier OA.

In order to realize the Hilbert transform filter by tapped delay line 2 and weighting adder 3, resistances ri ($i=1$ to N) of resistors Ri are set such that $$r1:r2:\ldots rN$$
$$=1/\Delta\tau:1/3\Delta\tau:\ldots:1/(2N-1)\Delta\tau \quad (7)$$

Figure 5:
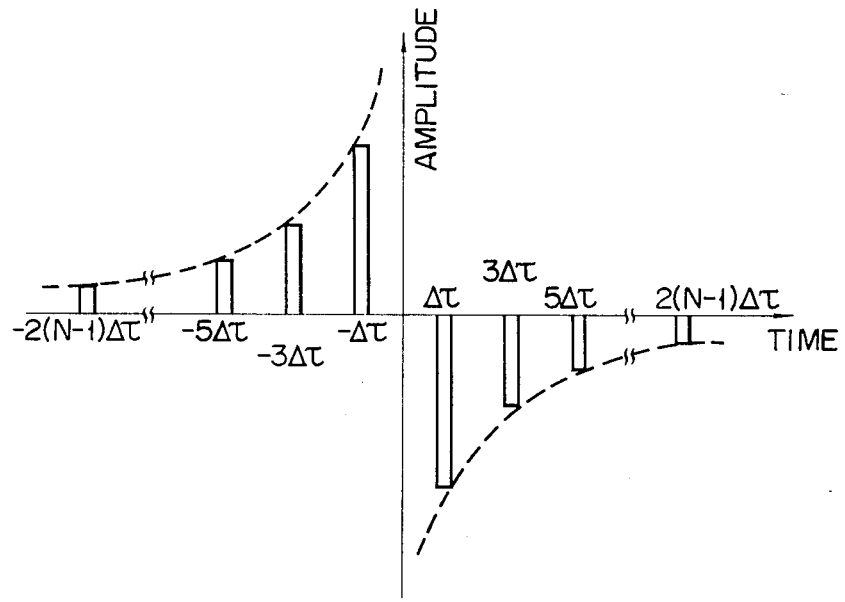
FIG. 5 shows rectangular waveform response characteristics of the Hilbert transform filter having taps.

FIG. 5 shows an output waveform of the Hilbert-transform filter when a rectangular waveform having a duration shorter than the inter-tap delay time $2\Delta\tau$ of tapped delay line 2 is received. In this case, it is assumed that the bandwidth of the filter is infinite.

A waveform equalizer according to a second embodiment of the present invention will be described with reference to FIG. 6. In this waveform equalizer, an output signal of weighting adder 17 is combined with an output signal of tapped delay line 13. Therefore, the waveform equalizer of the second embodiment has a simpler arrangement than that of the first embodiment.

Figure 6:
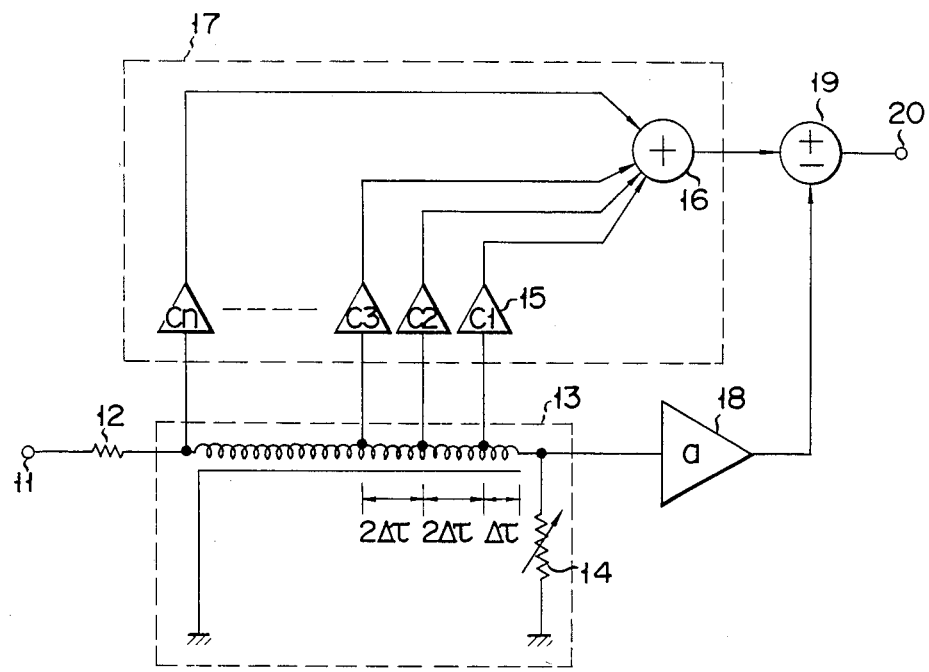
FIG. 6 shows another arrangement of a waveform equalizer according to the invention.

Referring to FIG. 6, a signal reproduced from a magnetic recording medium is supplied from input terminal 11 to tapped delay line 13 through matching resistor 12. The receiving end of tapped delay line 13 is terminated through a variable resistor 14 as a reflecting element.

Voltages at the respective taps of tapped delay line 13 are added together by a weighting adder 17 which comprises weighting elements 15 connected to respective taps and an adder 16 for adding outputs of weighting elements 15. A voltage taken from the receiving end of tapped delay line 13 is amplified by an amplifier 18. An output of amplifier 18 is combined with an output of the weighting adder 17 in combiner 19 to provide an equalized output at an output terminal 20.

The operation of the waveform equalizer according to the second embodiment will now be described in detail. Let a signal (reproduced original waveform) applied to input terminal 11 be $$f\{t+(2N-1)\Delta\tau\}$$

where N is the number of taps of tapped delay line 13 and $\Delta\tau$ is a unit delay time. A voltage x appearing at the receiving end of tapped delay line 13 is given by $$x=f(t)+f(t)(R-ZO)/(R+ZO)$$
$$=2Rf(t)/(R+ZO) \quad (8)$$

where R is the resistance of variable resistor 14, and ZO is the characteristic impedance of tapped delay line 13.

It should be noted that the voltage X appearing at the receiving end of tapped delay line 13 is delayed by a total delay time $(2N-1)\Delta\tau$ of tapped delay line 13.

A voltage yn appearing at the nth tap is given as follows:

$$yn = f(t + (2n - 1)\Delta\tau) + \quad (9)$$
$$(R - ZO)f\{t - (2n - 1)\Delta\tau\}/(R + ZO)$$

The weighting factor (tap gain) Cn defined by resistance of each weighting element 15 connected to the corresponding tap is set in proportion to $1/(2n-1)$. In other words, a weighting of $1/(2n-1)$ is performed for the tap voltage having the delay time of $(2n-1)\Delta\tau$ from the receiving end of tapped delay line 13. For example, if $CN=1/(2n-1)$, an output y of weighting adder 17 becomes:

$$y = [(R + ZO) \cdot \sum_{n=1}^{N} Cn\{f(t + (2n - 1)\Delta\tau)\} + \quad (10)$$
$$(R - ZO) \sum_{n=1}^{N} Cn\{f(t - (2n - 1)\Delta\tau)\}]/(R + ZO)$$

When the gain of amplifier 18 is given as a, an output g(t) of combiner 19 is given by $$g(t) = y \pm ax \quad (11)$$

$$= \left( R \left[ \sum_{n=1}^{N} Cn\{f(t + (2n - 1)\Delta\tau) + \right.\right.$$

$$f(t - (2n - 1)\Delta\tau)\} \pm 2af(t) \right] +$$

$$ZO \cdot \sum_{n=1}^{N} Cn\{f(t + (2n - 1)\Delta\tau) -$$

$$f(t - (2n - 1)\Delta\tau)\} \right) /(R + ZO)$$

The second term in [] represents the Hilbert transform of the reproduced original waveform, and the first term in [] becomes substantially $\pm 2Raf(t)$ which is proportional to a waveform obtained by delaying the reproduced original waveform a predetermined time under the assumption that the gain a of amplifier 18 is set so as to satisfy $$\sum_{n=1}^{N} Cn << a\ldots \quad (12)$$

Equation (11) can be thus rewritten as follows:

$$g(t) = \left[ \pm 2Raf(t) + ZO \cdot \sum_{n=1}^{N} Cn\{f(t + (2n - 1)\Delta\tau) - \right. \quad (13)$$
$$f(t - (2n - 1)\Delta\tau)\} \right] /(R + ZO)$$

The above equation indicates that the Hilbert-transformed waveform and the delayed waveform of the original waveform are combined at a predetermined ratio based on the resistance R of variable resistor 14.

To convert the longitudinal-perpendicular superposed waveform to a longitudinal waveform, the resistance R is adjusted such that the ratio of the Hilbert-transformed waveform to the delayed waveform becomes $\alpha V:\alpha H$ to be subsequently added together by combiner 19. On the other hand, when the longitudinal-perpendicular superposed waveform is to be converted to a perpendicular waveform, the resistance R is adjusted such that the ratio of the Hilbert-transformed waveform to the delayed waveform is set to $\alpha H:\alpha V$.

Thereafter, these waveforms are subtractively combined by combiner 19.

Figure 7:
FIG. 7 shows an equalized output waveform the equalizer of FIG. 6 which receives the longitudinal-perpendicular composite waveform.

FIG. 7 shows a longitudinal-perpendicular superposed input waveform 21 applied to tapped delay line 13 and an equalized longitudinal output waveform 22 when delay line 13 has eight taps.

According to the arrangement shown in FIG. 6, the additional delay line used in the arrangement of FIG. 2 need not be used.

Various changes and modifications may be made within the spirit and scope of the present invention. For example, a waveform equalizer may be arranged by only a Hilbert transform filter comprising a tapped delay line and a weighting adder, which converts a longitudinal waveform to a perpendicular waveform. Furthermore, the waveform equalizer according to the present invention may also be used to equalize the waveform of a signal reproduced from a longitudinal magnetic recording medium and having both longitudinal and perpendicular waveform components to the longitudinal waveform.

The tapped delay line may have only the input tap (PN) without intermediate taps. In each of the embodiments described above, the waveform equalizer comprises the adder, the amplifier and the combiner separately. However, an operation amplifier may also be used to simultaneously achieve the functions of the adder, the amplifier and the combiner. The reflecting element is not limited to a variable resistor.

What is claimed is:

1. A waveform equalizer for equalizing a waveform of a signal reproduced from a magnetic recording medium, comprising:
   a tapped delay line having a first end, a second end and at least one tap, said first end being connected to receive the signal;
   reflecting means, connected to said second end of said tapped delay line, for reflecting at said second end the reproduced signal supplied to said first end; and
   weighting means for weighting a voltage at said tap of said tapped delay line.

2. An equalizer according to claim 1, wherein said reflecting means comprises means for short-circuiting said second end of said tapped delay line.

3. An equalizer according to claim 1, wherein said reflecting means comprises a resistive element.

4. A waveform equalizer according to claim 1, further comprising:
   delay circuit means for delaying the reproduced signal by a predetermined time; and
   combining means for combining output signals of said delay circuit means and said weighting means at a predetermined ratio.

5. An equalizer according to claim 1, wherein said tapped delay line comprises a plurality of taps, said weighting means is arranged to weight output voltages of said taps, and there is further provided adding means for adding together output voltages weighted by said weighting means.

6. An equalizer according to claim 4, wherein the delay time provided by said delay circuit means to the reproduced signal is substantially equal to a delay time between said first and second ends of said tapped delay line.

7. A waveform equalizer for equalizing a waveform of a signal reproduced from a magnetic recording medium, comprising:
   a tapped delay line having a first end, a second end and a plurality of taps, said first end being connected to receive the reproduced signal;
   reflecting means, connected to said second end of said tapped delay line, for reflecting a part of the reproduced signal applied to said first end;
   weighting means for weighting tap voltages of said tapped delay line; and
   adding means for adding together voltages weighted by said weighting means.

8. An equalizer according to claim 7, wherein said weighting means is arranged to provide a weighting coefficient to each of the tap voltages which is inversely proportional to a delay time between the corresponding tap and said second end.

9. An equalizer according to claim 7, wherein said weighting means comprises resistive elements.

10. A waveform equalizer for equalizing a waveform of a signal reproduced from a magnetic recording medium, comprising:
    a tapped delay line having a first end, a second end and at least one tap, said first end being connected to receive the reproduced signal;
    reflecting means, connected to said second end of said tapped delay line, for reflecting a part of the reproduced signal applied to said first end;
    weighting means for weighting a tap voltage of said tapped delay line; and
    combining means for combining an output voltage of said weighting means with an output voltage of said second end of said tapped delay line.

11. An equalizer according to claim 10, wherein said reflecting means comprises a resistive element.

12. An equalizer according to claim 10, wherein the reflecting coefficient of said reflecting means is determined in accordance with a ratio of a longitudinal waveform component to a perpendicular waveform component in the reproduced signal.

13. An equalizer according to claim 10, wherein said tapped delay line comprises a plurality of taps, said weighting means is arranged to weight output voltages of said taps, and there is further provided adding means for adding together output voltages weighted by said weighting means.

14. An equalizer according to claim 13, wherein weighting coefficients produced by said weighting means to tap voltages are each inversely proportional to a delay time between the corresponding tap and said second end of said tapped delay line.

15. An equalizer according to claim 10, wherein said combining means is an adder or a subtracter.

* * * * *